(12) United States Patent
Yano et al.

(10) Patent No.: US 10,450,678 B2
(45) Date of Patent: Oct. 22, 2019

(54) YARN MANUFACTURING DEVICE

(71) Applicant: Murata Machinery, Ltd., Kyoto-shi, Kyoto (JP)

(72) Inventors: Fumiaki Yano, Kyoto (JP); Hiroki Takashima, Kyoto (JP); Shuichi Fukuhara, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 838 days.

(21) Appl. No.: 14/906,468

(22) PCT Filed: Jul. 22, 2013

(86) PCT No.: PCT/JP2013/069817
§ 371 (c)(1),
(2) Date: Jan. 20, 2016

(87) PCT Pub. No.: WO2015/011772
PCT Pub. Date: Jan. 29, 2015

(65) Prior Publication Data
US 2016/0160402 A1    Jun. 9, 2016

(51) Int. Cl.
*D02G 3/16* (2006.01)
*D01H 9/00* (2006.01)
(Continued)

(52) U.S. Cl.
CPC ............... *D02G 3/16* (2013.01); *B65H 67/02* (2013.01); *B65H 67/083* (2013.01); *D01F 9/127* (2013.01);
(Continued)

(58) Field of Classification Search
CPC .......... D01F 9/127; D01H 9/005; D01H 9/18; D01H 13/14; D02G 3/16; D02G 3/22;
(Continued)

(56) References Cited

U.S. PATENT DOCUMENTS 5,015,867 A    5/1991   Siegel et al.
2002/0161470 A1 10/2002 Kusuzono et al.
(Continued)

FOREIGN PATENT DOCUMENTS

CN    102953171 A    3/2013
EP      2090538 A2    8/2009
(Continued)

OTHER PUBLICATIONS

Japanese language International Search Report dated Oct. 1, 2013 and its English language translation issued in corresponding PCT application PCT/JP2013/069817 which cites the foreign patent document listed above.
(Continued)

*Primary Examiner* — Xiao S Zhao
*Assistant Examiner* — Joseph S Leyson
(74) *Attorney, Agent, or Firm* — DLA Piper LLP, US (57) ABSTRACT

A yarn producing apparatus produces carbon nanotube (CNT) yarn by aggregating CNT fibers, A substrate support supports a CNT forming substrate, a winding unit continuously draws the CNT fibers, a yarn producing unit aggregates the CNT fibers, a status monitor monitors a state of the CNT yarn, and a supply state changing mechanism changes a supply state of the CNT fibers, based on a result of monitoring by the status monitor.

5 Claims, 7 Drawing Sheets

(51) Int. Cl.
  *D01F 9/127* (2006.01)
  *D01H 13/14* (2006.01)
  *B65H 67/02* (2006.01)
  *B65H 67/08* (2006.01)
  *D01H 1/11* (2006.01)
  *C01B 32/158* (2017.01)

(52) U.S. Cl.
  CPC ............... *D01H 1/11* (2013.01); *D01H 9/005* (2013.01); *D01H 13/14* (2013.01); *B65H 2701/314* (2013.01); *C01B 32/158* (2017.08); *D10B 2101/122* (2013.01)

(58) Field of Classification Search
  CPC ................. B65H 67/02; B65H 67/083; B65H 2701/314; D10B 2101/122; C01B 32/158
  See application file for complete search history.

(56) References Cited

U.S. PATENT DOCUMENTS

| | | | |
|---|---|---|---|
| 2007/0237959 A1* | 10/2007 | Lemaire | B82Y 30/00 428/408 |
| 2008/0170982 A1 | 7/2008 | Zhang et al. | |
| 2015/0147573 A1 | 5/2015 | Zhang et al. | |
| 2015/0308018 A1 | 10/2015 | Zhang et al. | |
| 2016/0032499 A1* | 2/2016 | Cooper | D02G 3/16 57/59 |
| 2016/0083872 A1 | 3/2016 | Zhang et al. | |
| 2016/0251778 A1 | 9/2016 | Zhang et al. | |
| 2016/0273133 A1 | 9/2016 | Zhang et al. | |

FOREIGN PATENT DOCUMENTS

| | | |
|---|---|---|
| JP | 09228163 A | 9/1997 |
| JP | 2010065339 A | 3/2010 |
| JP | 2010-116632 A | 5/2010 |
| JP | 4900619 B2 | 3/2012 |
| JP | 2013011039 A | 1/2013 |
| WO | 2007119747 A1 | 10/2007 |

OTHER PUBLICATIONS

Extended European Search Report dated Feb. 14, 2017 issued in corresponding European Patent Application No. 13889971.1 (EP 13 88 9971) cites the documents above.

* cited by examiner

YARN MANUFACTURING DEVICE

CROSS REFERENCE TO RELATED APPLICATIONS

This application is a national stage of international application no. PCT/JP2013/069817, filed on Jul. 22, 2013, which is incorporated herein by reference.

TECHNICAL FIELD

The present invention relates to a yarn producing apparatus for producing carbon nanotube yarn from carbon nanotube fibers.

BACKGROUND ART

An example of the yarn producing apparatus as described above includes a drawing unit that continuously draws carbon nanotube fibers from a carbon nanotube forming substrate and a yarn producing unit that twists the carbon nanotube fibers drawn by the drawing unit to produce yarn (for example, see Patent Literature 1).

CITATION LIST

Patent Literature

[Patent Literature 1] Japanese Patent Application Laid-Open Publication No. 2010-116632

SUMMARY OF INVENTION

Technical Problem

In such yarn producing apparatus, the performance of drawing carbon nanotube fibers from the carbon nanotube forming substrate may vary with, for example, the quality of the carbon nanotube forming substrate. If the drawing performance decreases, a predetermined amount of carbon nanotube fibers cannot be obtained, and yarn of a desired thickness cannot be produced. In the field of such yarn producing apparatus, it is requested to stably produce carbon nanotube yarn of a desired thickness.

It is therefore an object of the present invention to provide a yarn producing apparatus capable of stably producing carbon nanotube yarn of a desired thickness.

Solution to Problem

A yarn producing apparatus according to an aspect of the present invention produces carbon nanotube yarn by aggregating carbon nanotube fibers. The yarn producing apparatus includes a substrate support, a continuous drawing unit, a yarn producing unit, a status monitor, and a supply state changing mechanism. The substrate support is configured to support a carbon nanotube forming substrate. The continuous drawing unit is configured to continuously draw the carbon nanotube fibers from the carbon nanotube forming substrate. The yarn producing unit is configured to aggregate the carbon nanotube fibers drawn by the continuous drawing unit. The status monitor is configured to monitor a state of the carbon nanotube fibers drawn from the carbon nanotube forming substrate or the carbon nanotube yarn. The supply state changing mechanism is configured to change a supply state of the carbon nanotube fibers drawn from the carbon nanotube forming substrate and supplied to the yarn producing unit, based on a result of monitoring by the status monitor.

In this yarn producing apparatus, the supply state of the carbon nanotube fibers supplied to the yarn producing unit is changed based on the result of monitoring by the status monitor. By changing the supply state of carbon nanotube fibers based on the state of the carbon nanotube fibers or the carbon nanotube yarn as described above, the thickness of the carbon nanotube yarn produced using the carbon nanotube fibers can be kept constant. Carbon nanotube yarn of a desired thickness thus can be stably produced.

The substrate support may include a plurality of substrate supports, and the supply state changing mechanism may change a supply state of the carbon nanotube fibers by changing the number of carbon nanotube forming substrates from which the carbon nanotube fibers are drawn. By changing the number of carbon nanotube forming substrates from which the carbon nanotube fibers are drawn as described above, the supply state of the carbon nanotube fibers can be easily changed.

The supply state changing mechanism may include an initial drawing unit and a controller. In this case, the initial drawing unit may draw the carbon nanotube fibers from the carbon nanotube forming substrate and bring the drawn carbon nanotube fibers into contact with the carbon nanotube fibers drawn from another carbon nanotube forming substrate. The controller may control the initial drawing unit such that the carbon nanotube fibers are drawn from the carbon nanotube forming substrate and the drawn carbon nanotube fibers are brought into contact with the carbon nanotube fibers drawn from another carbon nanotube forming substrate when adding the carbon nanotube forming substrate to draw the carbon nanotube fibers. As described above, the carbon nanotube fibers drawn by the initial drawing unit are brought into contact with the carbon nanotube fibers drawn from another carbon nanotube forming substrate and are combined with them. With this configuration, the carbon nanotube fibers drawn by the initial drawing unit can be easily supplied to the yarn producing unit together with the carbon nanotube fibers drawn from another carbon nanotube forming substrate.

The initial drawing unit may draw the carbon nanotube fibers from the carbon nanotube forming substrate by suction force. In this case, the carbon nanotube fibers can be drawn with a simple configuration using suction force.

The initial drawing unit may include a suction tube and a driver. In this case, the suction tube may have a suction port configured to suck the carbon nanotube fibers. The driver may allow the suction tube to advance to and retract from the carbon nanotube forming substrate from which the carbon nanotube fibers are to be drawn, such that the carbon nanotube fibers sucked by the suction tube cross the carbon nanotube fibers drawn from another carbon nanotube forming substrate. In this configuration, the suction tube is moved in the direction away from the carbon nanotube forming substrate, so that the carbon nanotube fibers are drawn by the suction force of the suction tube. The drawn carbon nanotube fibers cross the carbon nanotube fibers drawn from another carbon nanotube forming substrate and become combined with them. By advancing and retracting the suction tube, the carbon nanotube fibers drawn by the initial drawing unit can be easily supplied to the yarn producing unit, together with the carbon nanotube fibers drawn from another carbon nanotube forming substrate.

The suction tube may have an arc shape. The driver may advance and retract the suction tube so as to surround the carbon nanotube fibers drawn from another carbon nanotube forming substrate. In this case, the suction tube is retracted in the direction away from the carbon nanotube forming substrate in a state in which the carbon nanotube fibers are drawn by the suction tube, so that the carbon nanotube fibers drawn by the suction tube swing about the position where they are drawn from the carbon nanotube forming substrate. The suction tube is further retracted so as to surround the carbon nanotube fibers drawn from another carbon nanotube forming substrate, so that the carbon nanotube fibers drawn by the suction tube come into contact with the carbon nanotube fibers drawn from another carbon nanotube forming substrate. With this configuration, the carbon nanotube fibers drawn by the suction tube can be easily brought into contact with the carbon nanotube fibers drawn from another carbon nanotube forming substrate.

The driver may include a driving roller and a driven roller configured to sandwich the suction tube therebetween. The driving roller may be driven to advance and retract the suction tube. In this case, the suction tube can be easily advanced and retracted by driving the driving roller.

The suction tube may be provided with a guide on a surface thereof opposed to the driving roller. The guide may extend in a direction in which the suction tube extends. The driving roller may have a recess engaged with the guide. Alternatively, the suction tube may be provided with a guide on a surface thereof opposed to the driven roller. The guide may extend in a direction in which the suction tube extends. The driven roller may have a recess engaged with the guide. In these cases, the suction tube can be advanced and retracted in a predetermined orientation without the suction tube being rotated.

Advantageous Effects of Invention

According to the present invention, carbon nanotube yarn of a desired thickness can be stably produced.

BRIEF DESCRIPTION OF DRAWINGS

FIG. 5(*a*) is a diagram illustrating the operation of the initial drawing unit in FIG. 1, in which the suction pipe is retracted.

FIG. 5(*b*) is a diagram illustrating the operation of the initial drawing unit in FIG. 1, in which the suction pipe is advanced.

DESCRIPTION OF EMBODIMENTS

An embodiment of the present invention will be described in detail below with reference to the drawings. It should be noted that the same or corresponding elements are denoted with the same reference signs in the description of the drawings and an overlapping description will be omitted.

As shown in FIG. 1 to FIG. 4, a yarn producing apparatus 1 is an apparatus that produces carbon nanotube yarn (hereinafter referred to as "CNT yarn") Y from carbon nanotube fibers (hereinafter referred to as "CNT fibers") F while allowing the CNT fibers F to run. The yarn producing apparatus 1 is configured to include a fiber supply unit 2, a yarn producing unit 4, a nip roller unit 5, a status monitor 6, and a winding unit (continuous drawing unit) 7. The fiber supply unit 2, the yarn producing unit 4, the nip roller unit 5, the status monitor 6, and the winding unit 7 are arranged in this order on a predetermined line L. The CNT fibers F and the CNT yarn Y run from the fiber supply unit 2 toward the winding unit 7. The CNT fibers F are a set of a plurality of fibers of carbon nanotube. The CNT yarn Y is CNT fibers F aggregated into yarn by the yarn producing unit 4.

Figure 1:
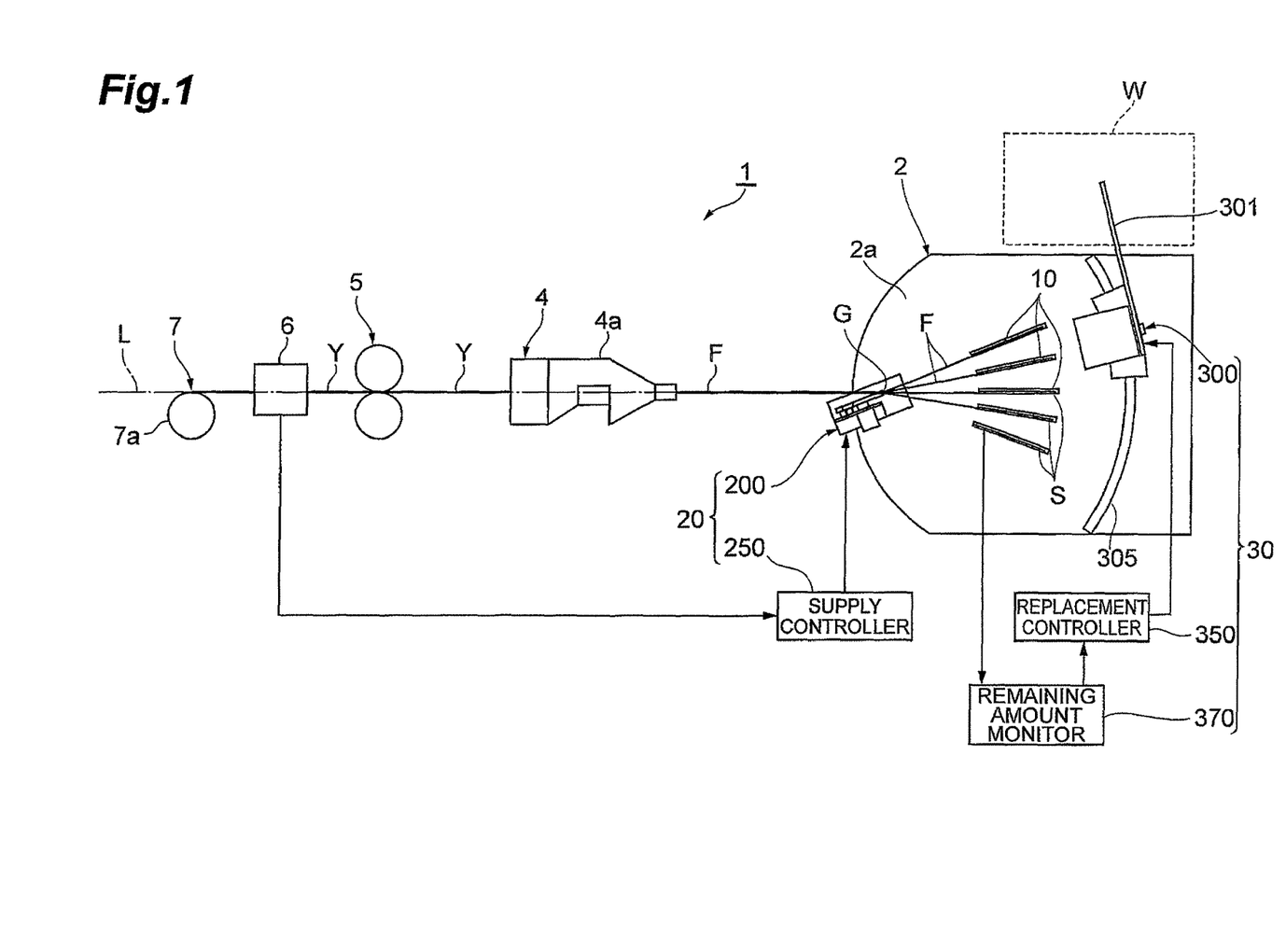
FIG. 1 is a plan view schematically illustrating the configuration of a yarn producing apparatus according to an embodiment.

The fiber supply unit 2 holds a carbon nanotube forming substrate (hereinafter referred to as "CNT forming substrate") S from which CNT fibers F are drawn. The CNT forming substrate S is called a carbon nanotube forest or a vertically aligned carbon nanotube structure in which high-density and highly-oriented carbon nanotubes (for example, single-wall carbon nanotubes, double-wall carbon nanotubes, or multi-wall carbon nanotubes) are formed on a substrate by chemical vapor deposition or any other process. Examples of the substrate include a glass substrate, a silicon substrate, and a metal substrate.

The fiber supply unit 2 includes a substrate support 10, a supply state changing mechanism 20, and a substrate replacing mechanism 30. In the present embodiment, the fiber supply unit 2 includes five substrate supports 10. Each substrate support 10 removably supports a CNT forming substrate S from which CNT fibers F are drawn. The supply state changing mechanism 20 changes a supply state of CNT fibers F drawn from the CNT forming substrate S and supplied to the yarn producing unit 4. The substrate replacing mechanism 30 replaces the CNT forming substrate S supported by the substrate support 10 with another CNT forming substrate S. The details of the substrate support 10, the supply state changing mechanism 20, and the substrate replacing mechanism 30 will be described later.

The yarn producing unit 4 false-twists the CNT fibers F drawn by the nip roller unit 5 described later. The yarn producing unit 4 blows the supplied air around the CNT fibers F to false-twist CNT fibers F with the airflow to produce CNT yarn Y.

The nip roller unit 5 includes a pair of rollers for drawing the CNT fibers F. The CNT yarn Y twisted by the yarn producing unit 4 is sandwiched between the rollers in the nip roller unit 5, and the CNT yarn Y is sent to the winding unit 7 with rotation of the rollers. Although the CNT yarn Y flaps immediately after being output from the yarn producing unit 4, the rollers in the nip roller unit 5 sandwich the CNT yarn Y to eliminate or minimize the flap.

The status monitor 6 monitors the state of the CNT yarn Y, here, detects the thickness of the CNT yarn Y. Examples of the status monitor 6 include optical, contact, and capacitive sensors. Any sensor can be used as long as it can detect the thickness of the CNT yarn Y. The result of detection by the status monitor 6 is output to the supply controller 250.

The winding unit 7 includes a winding tube 7a. The CNT yarn Y is wound onto the winding tube 7a. The CNT yarn Y is wound onto the winding tube 7a whereby CNT fibers F are continuously drawn from the CNT forming substrate S.

The details of the substrate support 10 will now be described. As shown in, for example, FIG. 1 and FIG. 2, the substrate support 10 supports a CNT forming substrate S such that the CNT forming substrate S stands vertically to the base plate 2a of the fiber supply unit 2. The configuration in which the CNT forming substrate S is supported so as to stand vertically to the base plate 2a is given only for illustration. Alternatively, the CNT forming substrate S may be supported such that the substrate surface is parallel to the surface of the base plate 2a. The CNT fibers F drawn from a plurality of CNT forming substrates S are joined at a point G of propagation of twisting that is produced by false-twisting by the yarn producing unit 4, on the predetermined line L. A plurality of CNT fibers F aggregate with each other by the force of twisting given by the yarn producing unit 4 and the Van der Waals force between the CNT fibers F. A plurality of substrate supports 10 are placed side by side on the base plate 2a such that the respective end surfaces from which CNT fibers F are drawn face the propagation point G on the predetermined line L at which a plurality of CNT fibers F aggregate.

Figure 7:
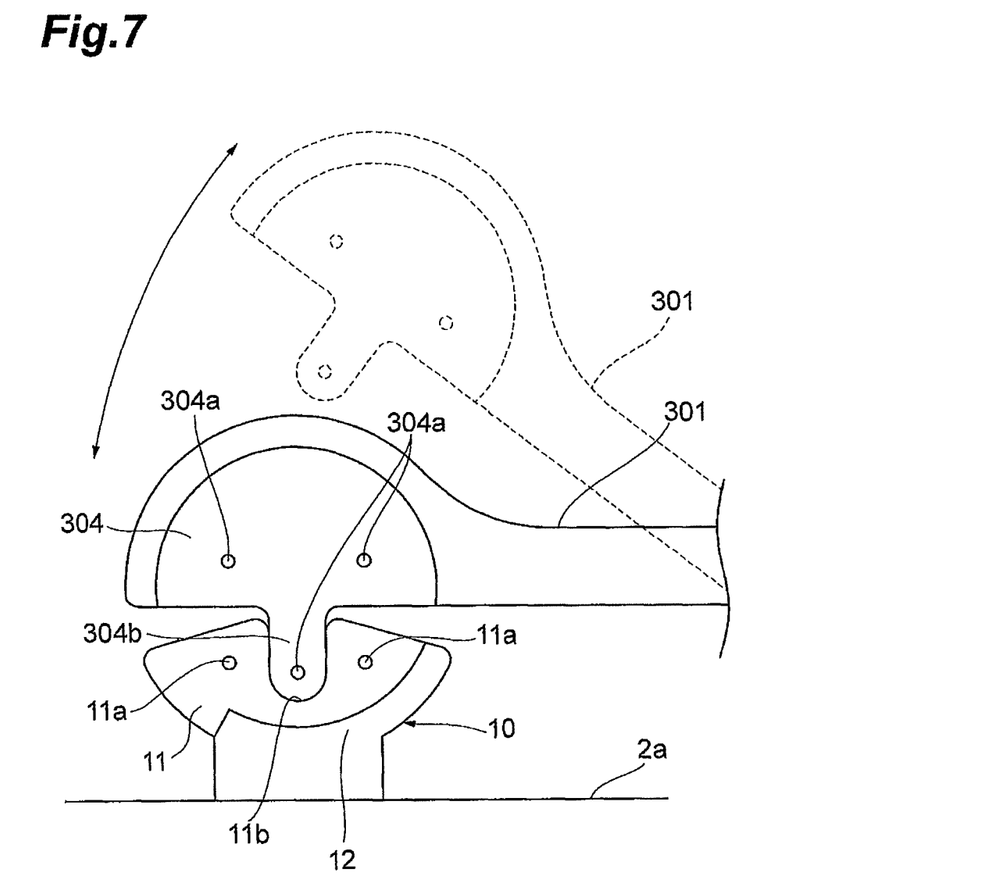
FIG. 7 is a diagram illustrating the holder of the arm moving to the hold position.

Each substrate support 10 includes a rear surface supporting portion 11 and an end portion supporting portion 12, as shown in FIG. 7. The end portion supporting portion 12 supports the end portion on the base plate 2a side of the CNT forming substrate S. In the present embodiment, the base plate 2a is provided with a horizontal surface on which the substrate supports 10 are placed. In the description of directions, one of the sides of the base plate 2a on which the substrate supports 10 and others are provided is the "top", and the other side on the base plate 2a on which the substrate support 10 and others are not provided is the "bottom".

The rear surface supporting portion 11 stands from the end portion supporting portion 12 and abuts on the rear surface of a CNT forming substrate S. The rear surface of a CNT forming substrate S is that surface of a CNT forming substrate S on which carbon nanotubes are not formed. The rear surface supporting portion 11 is opposed to the vicinity of the lower end of the CNT forming substrate S to be supported. The rear surface supporting portion 11 has a notch 11b cut downward from the upper edge. The rear surface supporting portion 11 has suction ports 11a at a section thereof opposed to the rear surface of the CNT forming substrate S. The suction force from the suction ports 11a allows the CNT forming substrate S to stick to the rear surface supporting portion 11 and allows the CNT forming substrate S to be supported on the rear surface supporting portion 11 and the end portion supporting portion 12.

The details of the supply state changing mechanism 20 will now be described. The supply state changing mechanism 20 includes an initial drawing unit 200 and a supply controller 250 as shown in FIG. 1 to FIG. 4. The initial drawing unit 200 draws CNT fibers F from a CNT forming substrate S by suction force. Specifically, the initial drawing unit 200 is configured to include a base plate 201, a roller support 202, a driving roller 203, a first driven roller 204, a second driven roller 205, a driving motor (driver) 206, and a suction tube 210.

Figure 3:
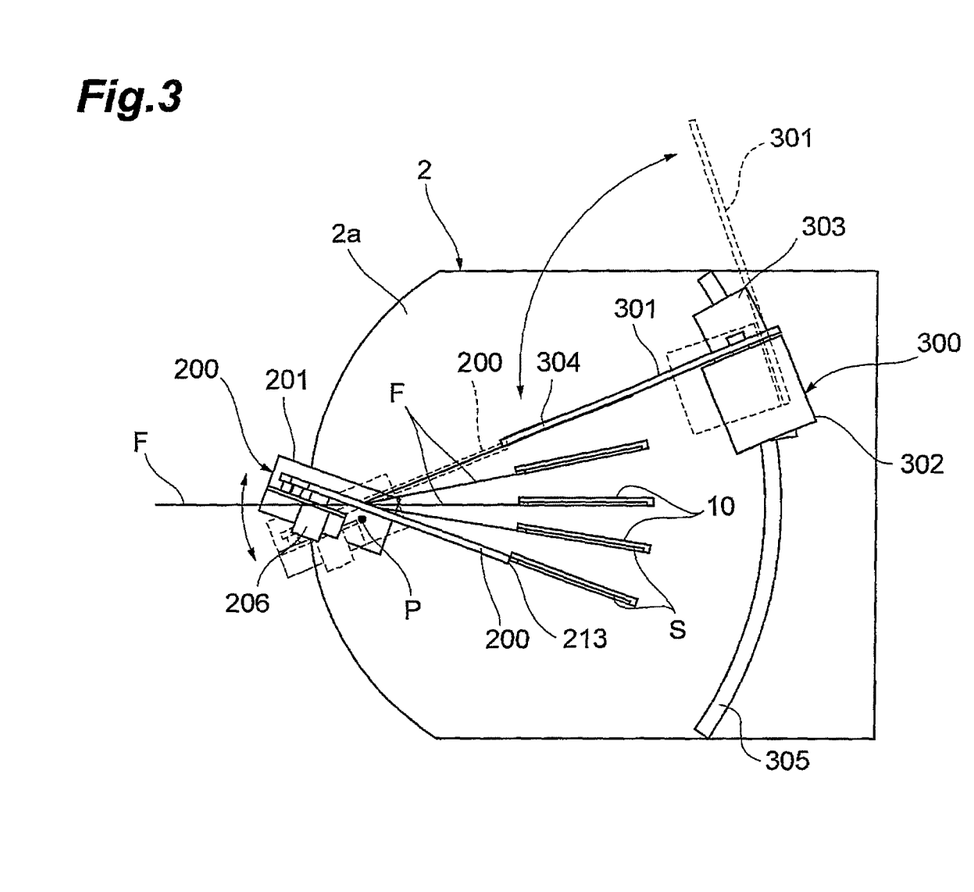
FIG. 3 is a plan view of the vicinity of the fiber supply unit in FIG. 1.

The base plate 201 is attached to the base plate 2a of the fiber supply unit 2 in a swingable manner. In the present embodiment, as shown in FIG. 3, the base plate 201 swings about the axis P located near the end portion of the base plate 201 on the substrate support 10 side. The initial drawing unit 200 swings about the axis P and advances the suction tube 210 toward the CNT forming substrate S, thereby bringing the front end (suction port 213) of the suction tube 210 closer to any one of five CNT forming substrates S placed on the fiber supply unit 2. The base plate 201 is swung by a drive source that drives the base plate 201.

The base plate 201 has a through hole 201a. The suction tube 210 is passed through the through hole 201a. With this configuration, when the suction tube 210 is advanced to and retracted from the CNT forming substrate S, the suction tube 210 does not interfere with the base plate 201.

Figure 4:
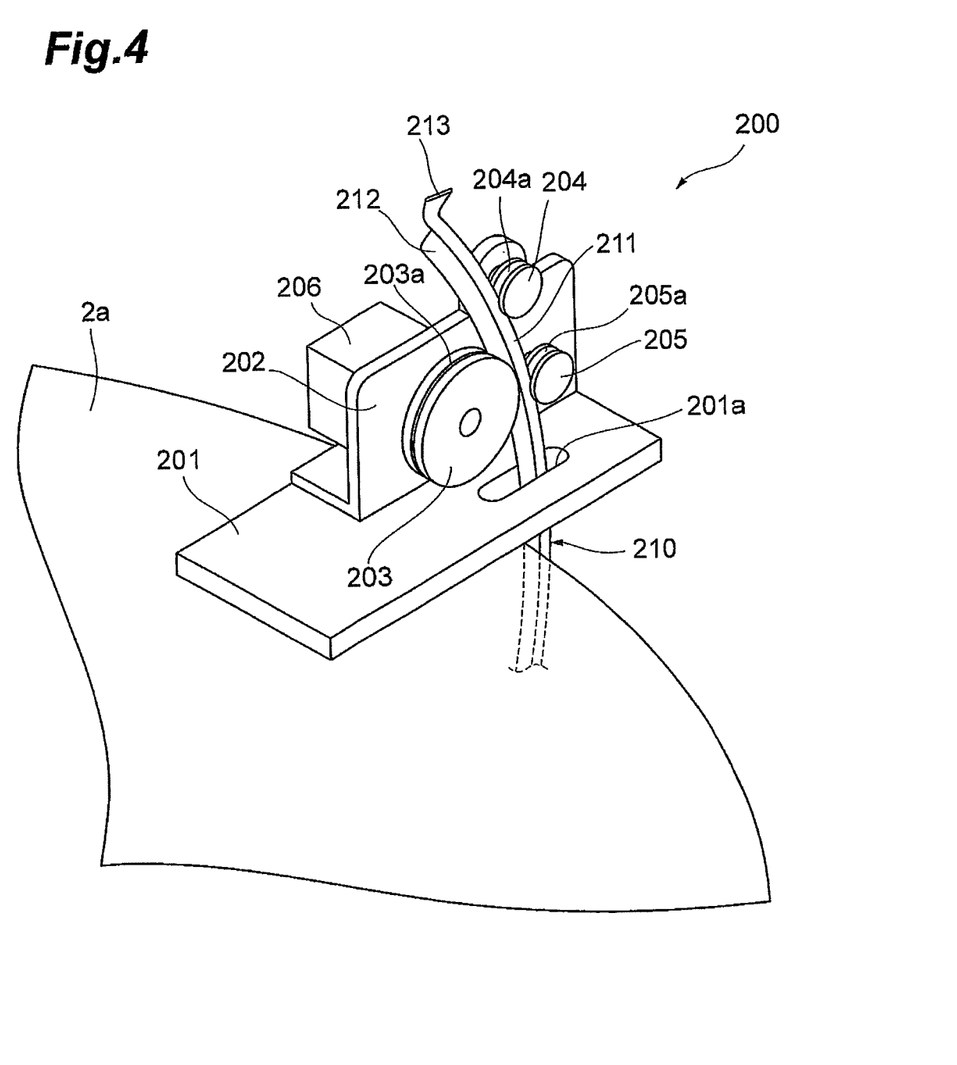
FIG. 4 is a perspective view of the initial drawing unit in FIG. 1.

The roller support 202 is fixed to the top surface of the base plate 201. On one surface of the roller support 202, the driving roller 203, the first driven roller 204, and the second driven roller 205 are rotatably attached. The driving roller 203 is arranged closer to the substrate support 10 than the first driven roller 204 and the second driven roller 205 are. The suction tube 210 is supported between the driving roller 203, and the first driven roller 204 and the second driven roller 205. The rotation of the driving roller 203 is driven by the driving motor 206. The rotation of the driving roller 203 allows the suction tube 210 to advance to and retract from the CNT forming substrate S. The first driven roller 204 and the second driven roller 205 are driven to rotate with the advancement and retraction of the suction tube 210.

The driving roller 203 has a recess 203a on the circumferential surface thereof. The recess 203a extends in the circumferential direction. The recess 203a holds the side surfaces of a guide 212 provided on the suction tube 210. The bottom of the recess 203a abuts on the end portion of the guide 212 of the suction tube 210 to allow the suction tube 210 to advance to and retract from the CNT forming substrate S with the rotation of the driving roller 203. The recess 203a of the driving roller 203 holds the guide 212 of the suction tube 210 to restrict the rotation of the suction tube 210.

A recess 204a and a recess 205a extending in the circumferential direction are provided on the circumferential surface of the first driven roller 204 and the circumferential surface of the second driven roller 205, respectively. The recesses 204a and 205a each have an arc-shaped cross section fitted on the outer shape of the tube portion 211 of the suction tube 210.

The recess 204a in the first driven roller 204 and the recess 205a in the second driven roller 205 are engaged with the tube portion 211 of the suction tube 210, and the recess 203a in the driving roller 203 is engaged with the guide 212 of the suction tube 210, thereby preventing disengagement of the suction tube 210 from the driving roller 203, the first driven roller 204, and the second driven roller 205.

The suction tube 210 includes the tube portion 211 and the guide 212. The tube portion 211 is a tubular member having an arc shape. The tube portion 211 has a suction port 213 at one end thereof. The suction port 213 is an opening formed like a slit. The opening is oriented in the outer circumferential direction of the arc-shaped tube portion 211. The other end of the tube portion 211 is connected to a suction device. The tube portion 211 is opposed to the first driven roller 204 and the second driven roller 205 on the outer circumferential surface of the arc shape and is opposed to the driving roller 203 on the inner circumferential surface of the arc shape.

The guide 212 is provided on the surface of the tube portion 211 that is opposed to the driving roller 203. The guide 212 is shaped like a thin plate and extends in the direction in which the tube portion 211 extends. The guide 212 is held in the recess 203a provided on the circumferential surface of the driving roller 203. In this configuration, the inner circumferential side of the arc shape of the suction tube 210 faces the substrate support 10.

The configuration of the initial drawing unit 200 drawing CNT fibers F from a CNT forming substrate S will now be described. CNT fibers F are drawn by the initial drawing unit 200, for example, when a new CNT forming substrate S is placed on a substrate support 10 and the drawing of the new CNT fibers F is started.

Figure 5A:
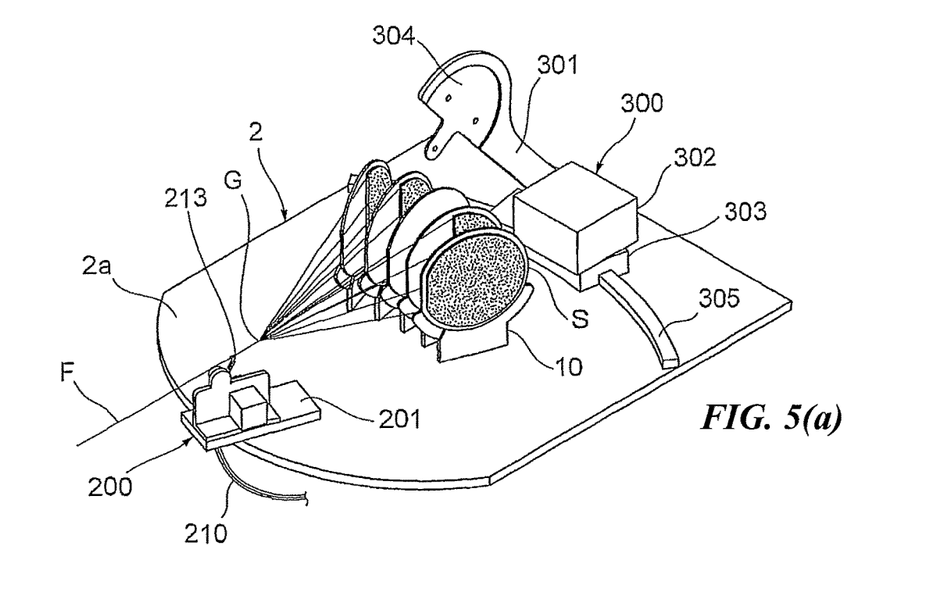
Figure 5B:
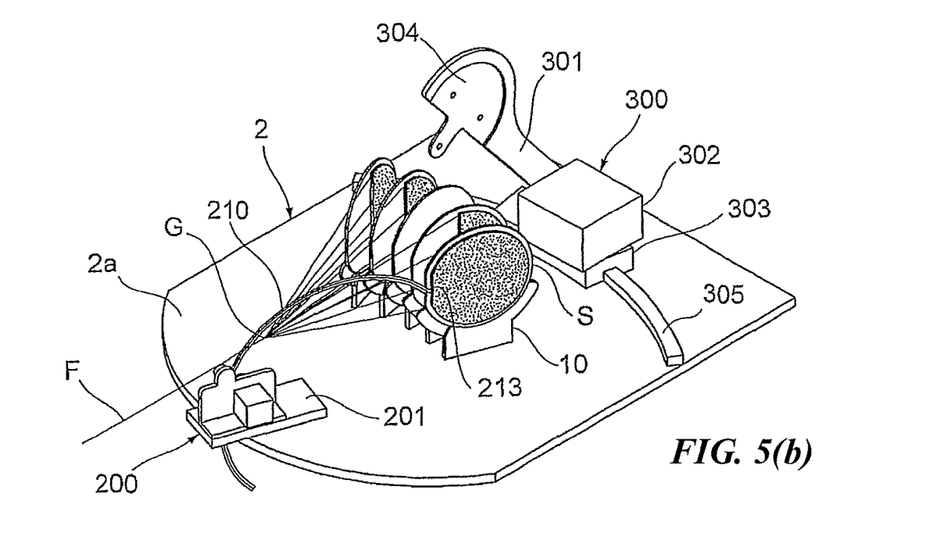

As shown in FIG. 5(*a*) and FIG. 5(*b*), the initial drawing unit 200 advances the suction tube 210 to the CNT forming substrate S from which CNT fibers F are to be drawn. The initial drawing unit 200 advances the suction tube 210 with the swing angle of the base plate 201 adjusted such that the suction tube 210 crosses the CNT fibers F drawn from another CNT forming substrate S (such that the CNT fibers F and the suction tube 210 cross each other as viewed from above). FIG. 5(*a*) and FIG. 5(*b*) illustrate the CNT fibers F drawn from the CNT forming substrate S at the front on the drawing sheet.

Figure 6:
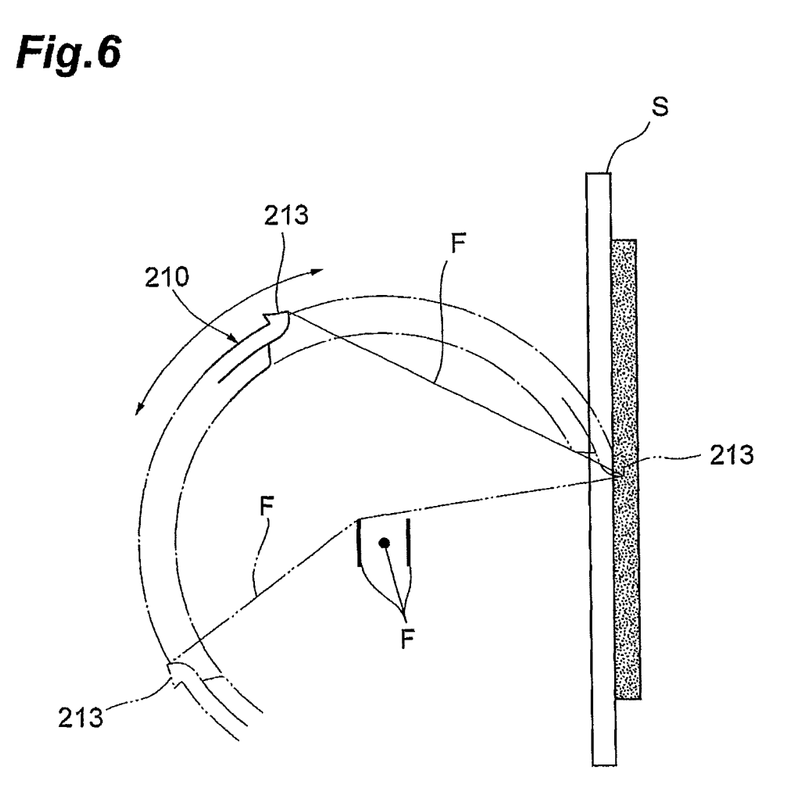
FIG. 6 is a diagram illustrating the suction pipe being retracted as viewed from the direction of CNT fibers running.

The suction tube 210 has an arc shape. When the suction tube 210 retracted on the bottom surface side of the base plate 2*a* as shown in FIG. 5(*a*) is advanced toward the CNT forming substrate S from which CNT fibers F are to be drawn as shown in FIG. 5(*b*), the suction port 213 moves over the CNT fibers F with the advancement of the suction tube 210 and then moves toward the bottom side again. That is, as shown in FIG. 6, when the suction port 213 is viewed along the direction of CNT fibers F running, the suction port 213 moves so as to surround the CNT fibers F drawn from another CNT forming substrate S.

As shown in FIG. 5(*b*), the suction tube 210 is advanced to bring the suction port 213 of the suction tube 210 closer to the end portion of the CNT forming substrate S, so that the suction force from the suction port 213 draws CNT fibers F from the CNT forming substrate S. The suction port 213 is oriented to the outer circumferential surface side of the tube portion 211. With this configuration, when the suction tube 210 is advanced toward the CNT forming substrate S, the suction port 213 is opposed to the end surface of the CNT forming substrate S. This configuration ensures that the suction force from the suction port 213 draws CNT fibers F from the CNT forming substrate S.

While the suction force from the suction port 213 draws CNT fibers F from the CNT forming substrate S, the initial drawing unit 200 allows the suction tube 210 to retract. As shown in FIG. 6, the suction port 213 moves so as to surround the CNT fibers F drawn from another CNT forming substrate S. With the movement of the suction port 213 so as to surround CNT fibers F drawn from another CNT forming substrate S, the CNT fibers F sucked out by the suction port 213 come into contact with and adhere to CNT fibers F downstream from the twisting propagation point G and are twisted into other CNT fibers F to be sent to the yarn producing unit 4.

As described above, the initial drawing unit 200 advances the suction tube 210 to draw CNT fibers F from a CNT forming substrate S and then retracts the suction tube 210, so that the newly drawn CNT fibers F aggregate and adhere to other CNT fibers F and are sent together with other CNT fibers F to the yarn producing unit 4.

The control of the initial drawing unit 200 by the supply controller 250 will now be described. The supply controller 250 controls the initial drawing unit 200 based on the result of detection by the status monitor 6 to draw CNT fibers F from a CNT forming substrate S. As shown in FIG. 5(*a*), among five CNT forming substrates S placed on the fiber supply unit 2, the CNT forming substrate S at the front is a standby CNT forming substrate S. Although the CNT forming substrate S at the front is a standby substrate in this example, the standby substrate may not be the one at the front but may be any other CNT forming substrate S, or a plurality of CNT forming substrate S may be standby substrates.

When a CNT forming substrate S other than the standby CNT forming substrate S (at the front) runs out of carbon nanotubes (carbon nanotubes have been completely drawn), or when the amount of CNT fibers F drawn from a CNT forming substrate S other than the standby CNT forming substrate S decreases due to a drawing failure or other reasons, the supply controller 250 draws CNT fibers F from the standby CNT forming substrate S and sends the drawn CNT fibers F together with the CNT fibers F drawn from other CNT forming substrates S to the yarn producing unit 4.

More specifically, the supply controller 250 controls the driving of the driving source for swinging the base plate 201 of the initial drawing unit 200 and the driving motor 206 for advancing and retracting the suction port 213 to allow the initial drawing unit 200 to draw CNT yarn Y from the standby CNT forming substrate S. For example, if the status monitor 6 detects that the thickness of the CNT yarn Y becomes smaller than the lower limit in a predetermined range, the supply controller 250 controls the initial drawing unit 200 such that the suction tube 210 advances toward the standby CNT forming substrate S to draw CNT fibers F as described above. The supply controller 250 then controls the initial drawing unit 200 such that the suction tube 210 retracts and the drawn CNT fibers F aggregate and adhere to other CNT fibers F.

Conversely, if the status monitor 6 detects that the thickness of the CNT yarn Y becomes larger than the lower limit in a predetermined range, the supply controller 250 performs control such that the drawn CNT fibers F are reduced. In order to reduce the drawn CNT fibers F, a cutting mechanism such as a cutter is provided between the CNT forming substrate S and the twisting propagation point G to cut the drawn CNT fibers F. Alternatively, a rod member may be moved across the path of CNT fibers F in the vicinity of the CNT forming substrate S from which CNT fibers F are being drawn, thereby to cut the CNT fibers F drawn from the CNT forming substrate S. This processing reduces the number of CNT forming substrate S from which CNT fibers F are drawn, and thus can reduce the thickness of the CNT yarn Y.

As described above, the supply controller 250 controls the initial drawing unit 200 based on the detection result from the status monitor 6, and adds a CNT forming substrate S to draw CNT fibers F or changes the number of substrates to control the amount of CNT fibers F supplied to the yarn producing unit 4 (control the supply state of CNT fibers F). The amount of CNT fibers F supplied to the yarn producing unit 4 may be controlled by changing the amount of CNT fibers F drawn from one CNT forming substrate S.

The details of the substrate replacing mechanism 30 will now be described. The substrate replacing mechanism 30 replaces the CNT forming substrate S supported on a substrate support 10 with another CNT forming substrate S. In the present embodiment, the substrate replacing mechanism 30 replaces the CNT forming substrate S supported on a substrate support 10 with a CNT forming substrate S stored in a substrate storage W provided in the vicinity of the fiber supply unit 2. The substrate replacing mechanism 30 can also move the CNT forming substrate S supported on one substrate support 10 to another substrate support 10.

Figure 2:
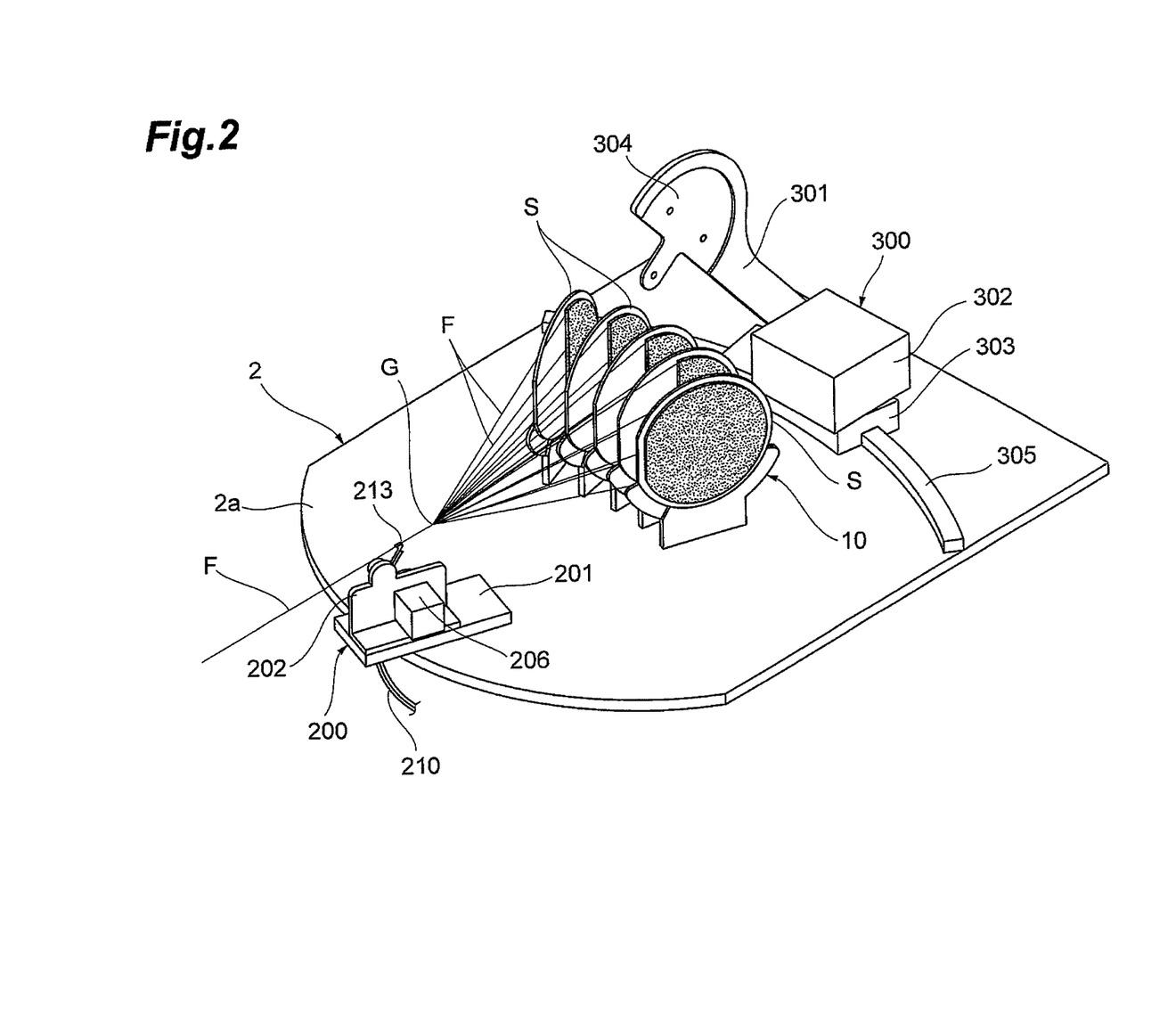
FIG. 2 is a perspective view of the vicinity of the fiber supply unit in FIG. 1.

The substrate replacing mechanism 30 is configured to include a substrate replacing unit 300, a replacement controller 350, and a remaining amount monitor 370, as shown in FIG. 1. As shown in FIG. 1 to FIG. 3, the substrate replacing unit 300 includes an arm (movement mechanism) 301, an arm driver (movement mechanism) 302, a body (movement mechanism) 303, a holder 304, and a rail 305. The rail 305 is fixed to the base plate 2a. The rail 305 extends along the direction of a row of a plurality of substrate supports 10. One end of the rail 305 extends toward the substrate storage W. The body 303 is engaged with the rail 305 to move along the rail 305. The arm 301 and other parts then move in the direction of a row of CNT forming substrates S each supported by a substrate support 10.

The arm driver 302 is mounted on the upper surface of the body 303 and turns about a vertical straight line relative to the body 303. The base end of the arm 301 is joined to a side surface of the arm driver 302. The arm driver 302 allows the arm 301 to swing about the joint with the arm 301 such that the front end of the arm 301 (the side having the holder 304) moves closer to and away from the base plate 2a. The arm driver 302 also allows the connection portion with the arm 301 to move in the vertical direction. That is, the arm driver 302 can move the entire arm 301 in the vertical direction.

The holder 304 is provided on the front end of the arm 301 (the end opposite to the end connected with the arm driver 302). The holder 304 is brought into abutment with the rear surface of a CNT forming substrate S. As shown in FIG. 7, the holder 304 has an extension 304b at the section in abutment with the substrate support 10. The extension 304b extends out toward the substrate support 10. The holder 304 has suction ports 304a at the section opposed to the rear surface of the CNT forming substrate S. The extension 304b also has a suction port 304a. The suction force from the suction ports 304a allows the CNT forming substrate S to stick to the holder 304 and allows the CNT forming substrate S to be held in the holder 304.

Since the extension 304b also has the suction port 304a, the entire CNT forming substrate S can be sucked by the suction ports 304a, rather than sucking a localized area of the CNT forming substrate S by the suction ports 304a. With this configuration, the CNT forming substrate S can be stably and reliably held by the holder 304.

When a CNT forming substrate S is received from a substrate support 10 or when a CNT forming substrate S is delivered to a substrate support 10, the substrate replacing unit 300 allows the holder 304 to move such that the surface of the rear surface supporting portion 11 of the substrate support 10 of interest that comes into abutment with the CNT forming substrate S is matched with the surface of the holder 304 that comes into abutment with the CNT forming substrate S. The extension 304b is then put into the notch 11b. The position where the holder 304 is located when receiving a CNT forming substrate S from a substrate support 10 or when delivering a CNT forming substrate S to a substrate support 10 is referred to as "hold position". The hold position is set for each substrate support 10. In the substrate replacing unit 300, the holder 304 can move to the hold position set for each substrate support 10.

The substrate replacing unit 300 allows the holder 304 to move between a hold position and the substrate storage W or between a hold position and another hold position. Specifically, the substrate replacing unit 300 replaces the CNT forming substrate S supported on the substrate support 10 by moving the body 303 along the rail 305, turning the arm driver 302 relative to the body 303, moving the entire arm 301 upward and downward, and swinging the arm 301 to move the holder 304 between the hold position and, for example, the substrate storage W.

The remaining amount monitor 370 monitors the remaining amount of CNT fibers F on the CNT forming substrate S supported on each substrate support 10. The remaining amount monitor 370 can determine the amount of CNT fibers F left on the CNT forming substrate S, for example, by measuring the weight of the CNT forming substrate S supported on the substrate support 10. Alternatively, the remaining amount monitor 370 can determine the amount of CNT fibers F left on the CNT forming substrate S by capturing an image of the CNT forming substrate S with a camera and processing the captured image. A failure in drawing CNT fibers F can be recognized based on temporal changes in amount of CNT fibers F left on the CNT forming substrate S.

Alternatively, the remaining amount monitor 370 can determine the amount of CNT fibers F left on the CNT forming substrate S, based on whether CNT fibers F are being drawn from the CNT forming substrate S. In this case, for example, an image of the region where CNT fibers F drawn from the CNT forming substrate S run is captured with a camera, and whether CNT fibers F are being drawn from the CNT forming substrate S can be grasped based on the captured image. For example, if CNT fibers F are not being drawn from the CNT forming substrate S, it can be determined that the CNT forming substrate S is empty of CNT fibers F. The remaining amount monitor 370 can monitor the remaining amount by any method other than the methods described above for monitoring the remaining amount of CNT fibers F.

The control of the substrate replacing unit 300 by the replacement controller 350 will now be described. The replacement controller 350 controls the substrate replacing unit 300 such that the CNT forming substrate S empty of CNT fibers F or having a drawing failure is replaced with a new CNT forming substrate S stored in the substrate storage W, based on the monitoring result of the remaining amount of CNT fibers F by the remaining amount monitor 370.

Specifically, if the remaining amount monitor 370 detects a CNT forming substrate S empty of CNT fibers F, the replacement controller 350 controls the substrate replacing unit 300 such that the empty CNT forming substrate S is received from the substrate support 10. The replacement controller 350 then controls the substrate replacing unit 300 such that the received empty CNT forming substrate S is stored into the substrate storage W. The replacement controller 350 then controls the substrate replacing unit 300 such that a new CNT forming substrate S is received from the substrate storage W and the new CNT forming substrate S is passed to the substrate support 10 that does not bear a CNT forming substrate S thereon. As described above, the replacement controller 350 controls the substrate replacing unit 300 based on the monitoring result from the remaining amount monitor 370 to replace the CNT forming substrate S.

The present embodiment is configured as described above. The supply state changing mechanism 20 changes the supply state of CNT fibers F to be supplied to the yarn producing unit 4, based on the monitoring result by the status monitor 6. By changing the supply state of the CNT fibers F based on the state of CNT yarn Y as described above, the thickness of CNT yarn Y produced using CNT fibers F can be kept constant. With this configuration, CNT yarn Y of a desired thickness can be stably produced.

The supply state changing mechanism 20 changes the supply state of CNT fibers F by changing the number of CNT forming substrates S from which CNT fibers F are drawn. By changing the number of CNT forming substrate S from which CNT fibers F are drawn as described above, the supply state of CNT fibers F can be easily changed.

The supply state changing mechanism 20 brings CNT fibers F drawn from a CNT forming substrate S into contact with CNT fibers F drawn from another CNT forming substrate S and combines them. With this configuration, the CNT fibers F drawn by the initial drawing unit 200 can be easily supplied to the yarn producing unit 4 together with the CNT fibers F drawn from another CNT forming substrate S.

The initial drawing unit 200 draws CNT fibers F from a CNT forming substrate S by suction force. In this case, CNT fibers F can be drawn with a simple configuration using suction force.

The initial drawing unit 200 advances and retracts the suction tube 210 to draw CNT fibers F from a CNT forming substrate S. The initial drawing unit 200 retracts the suction tube 210 such that the CNT fibers F drawn from the CNT forming substrate S cross the CNT fibers F drawn from another CNT forming substrate S. The drawn CNT fibers F thus cross the CNT fibers F drawn from another CNT forming substrate S and become combined with them. By advancing and retracting the suction tube 210, therefore, the CNT fibers F drawn by the initial drawing unit 200 can be easily supplied to the yarn producing unit 4 together with the CNT fibers F drawn from another CNT forming substrate S.

The suction tube 210 is formed in an arc shape. The suction tube 210 is advanced and retracted so as to surround the CNT fibers F drawn from another CNT forming substrate S. In this case, the suction tube 210 is retracted in the direction away from the CNT forming substrate S in a state in which CNT fibers F are drawn by the suction tube 210, so that the CNT fibers F drawn by the suction tube 210 swing about the position where they are drawn from the CNT forming substrate S. The suction tube 210 is then further retracted so as to surround the CNT fibers F drawn from another CNT forming substrate S, so that the CNT fibers F drawn by the suction tube 210 come into contact with the CNT fibers F drawn from another CNT forming substrate S. In this configuration, the CNT fibers F drawn by the suction tube 210 can easily be brought into contact with the CNT fibers F dawn from another CNT forming substrate S.

The initial drawing unit 200 has the suction tube 210 sandwiched between the driving roller 203, and the first driven roller 204 and the second driven roller 205. The driving roller 203 is driven to advance and retract the suction tube 210. In this case, the suction tube 210 can be easily advanced and retracted by driving the driving roller 203.

The suction tube 210 is provided with the guide 212 engaged in the recess 203a of the driving roller 203. In the initial drawing unit 200 with this configuration, the suction tube 210 can be advanced and retracted in a predetermined orientation without the suction tube 210 being rotated.

Although an embodiment and modifications of the present invention have been described above, the present invention is not intended to be limited to the foregoing embodiment. For example, in the foregoing embodiment, the status monitor 6 is used to detect the thickness of CNT yarn Y. However, in place of the status monitor 6, an image of the CNT fibers F drawn from a CNT forming substrate S may be captured with a camera, and the captured image may be processed to allow monitoring of the amount of CNT fibers F drawn from the CNT forming substrate S or as to whether CNT fibers F are being drawn. In this case, the supply controller 250 can control the initial drawing unit 200 based on the amount of CNT fibers F obtained based on the captured image or whether CNT fibers F are being drawn.

In the embodiment, the suction force from the suction port 213 is used to draw CNT fibers F from the CNT forming substrate S. However, CNT fibers F can be drawn by any method other than the suction force. For example, CNT fibers F can be drawn from the CNT forming substrate S using a tool called a microdrill. Alternatively, CNT fibers F may be drawn with an adhesive tape, a hook-like member, or any other means.

In the embodiment, the suction tube 210 is provided with the guide 212, and the guide 212 is engaged in the recess 203a of the driving roller 203. However, the guide 212 may be provided on the first driven roller 204 side in the suction tube 210, and the guide 212 may be engaged with the first driven roller 204 or the second driven roller 205. Alternatively, the guide 212 may be provided on both of the driving roller 203 side and the first driven roller 204 side in the suction tube 210 to be engaged in the recess 203a of the driving roller 203 and, for example, the recess 204a of the first driven roller 204. The use of a rack gear as the guide 212 and a pinion gear as the driving roller 203 can ensure reliable operation of the suction tube 210.

In place of the CNT forming substrate S, for example, a device that continuously synthesizes carbon nanotubes to supply CNT fibers F may be used as the supply source of CNT fibers F. In the embodiment, the yarn producing unit 4 twists CNT fibers F with airflow. However, the yarn producing unit may twist CNT fibers F by any method other than using airflow. The yarn producing unit 4 and the winding unit 7 may be replaced by, for example, a device that winds CNT yarn Y while twisting (genuine-twisting) CNT fibers F to produce CNT yarn Y. Alternatively, non-twisted aggregated yarn may be produced using a thin tube. In this case, there is no twisting propagation point G, and a roller or a guide may be employed for concentrating CNT fibers F at the position corresponding to the propagation point G.

INDUSTRIAL APPLICABILITY

According to the present invention, carbon nanotube yarn of a desired thickness can be stably produced.

REFERENCE SIGNS LIST

1 . . . yarn producing apparatus, 4 . . . yarn producing unit, 6 . . . status monitor, 7 . . . winding unit (continuous drawing unit), 10 . . . substrate support, 11a . . . suction port (suction port in the substrate support), 20 . . . supply state changing mechanism, 30 . . . substrate replacing mechanism, 200 . . . initial drawing unit, 203 . . . driving roller, 203a . . . recess, 204 . . . first driven roller (driven roller), 204a . . . recess, 205 . . . second driven roller (driven roller), 205a . . . recess, 210 . . . suction tube, 206 . . . driving motor (driver), 212 . . . guide, 213 . . . suction port, 250 . . . supply controller (controller of the supply state changing mechanism), 300 . . . substrate replacing unit, 301 . . . arm (movement mechanism), 302 . . . arm driver (movement mechanism), 303 . . . body (movement mechanism), 304 . . . holder, 304a . . . suction port (suction port in the holder), 350 . . . replacement controller (controller of the substrate replacing mechanism), 370 . . . remaining amount monitor, F . . . CNT fibers, S . . . CNT forming substrate, Y . . . CNT yarn, W . . . substrate storage.

The invention claimed is:

1. A yarn producing apparatus for producing carbon nanotube yarn by aggregating carbon nanotube fibers, the yarn producing apparatus comprising:

a substrate support configured to support a carbon nanotube forming substrate;

a continuous drawing unit configured to continuously draw the carbon nanotube fibers from the carbon nanotube forming substrate;

a yarn producing unit configured to aggregate the carbon nanotube fibers drawn by the continuous drawing unit;

a status monitor configured to monitor a state of the carbon nanotube fibers drawn from the carbon nanotube forming substrate or the carbon nanotube yarn; and a supply state changing mechanism configured to change a supply state of the carbon nanotube fibers drawn from the carbon nanotube forming substrate and supplied to the yarn producing unit, based on a result of monitoring by the status monitor, wherein the substrate support includes a plurality of substrate supports;

the supply state changing mechanism changes a supply state of the carbon nanotube fibers by changing a number of carbon nanotube forming substrates from which the carbon nanotube fibers are drawn;

the supply state changing mechanism includes an initial drawing unit configured to draw the carbon nanotube fibers from the carbon nanotube forming substrate and bring the drawn carbon nanotube fibers into contact with the carbon nanotube fibers drawn from another carbon nanotube forming substrate, and a controller configured to control the initial drawing unit such that the carbon nanotube fibers are drawn from the carbon nanotube forming substrate and the drawn carbon nanotube fibers are brought into contact with the carbon nanotube fibers drawn from another carbon nanotube forming substrate when adding the carbon nanotube forming substrate to draw the carbon nanotube fibers;

the initial drawing unit draws the carbon nanotube fibers from the carbon nanotube forming substrate by suction force;

the initial drawing unit includes a suction tube having a suction port configured to suck the carbon nanotube fibers, and a driver configured to allow the suction tube to advance to and retract from the carbon nanotube forming substrate from which the carbon nanotube fibers are to be drawn, such that the carbon nanotube fibers sucked by the suction tube cross the carbon nanotube fibers drawn from another carbon nanotube forming substrate; and the suction tube has an arc shape, and the driver advances and retracts the suction tube so as to surround the carbon nanotube fibers drawn from another carbon nanotube forming substrate.

2. The yarn producing apparatus according to claim 1, wherein the driver includes a driving roller and a driven roller configured to sandwich the suction tube therebetween, the suction tube being made to advance and retract by driving the driving roller.

3. The yarn producing apparatus according to claim 2, wherein the suction tube is provided with a guide on a surface thereof opposed to the driving roller, the guide extending in a direction in which the suction tube extends, and the driving roller has a recess engaged with the guide.

4. The yarn producing apparatus according to claim 2, wherein the suction tube is provided with a guide on a surface thereof opposed to the driven roller, the guide extending in a direction in which the suction tube extends, and the driven roller has a recess engaged with the guide.

5. The yarn producing apparatus according to claim 3, wherein the suction tube is provided with a guide on a surface thereof opposed to the driven roller, the guide extending in a direction in which the suction tube extends, and the driven roller has a recess engaged with the guide.

* * * * *